US 6,724,572 B1

(12) United States Patent
Stoev et al.

(10) Patent No.: US 6,724,572 B1
(45) Date of Patent: Apr. 20, 2004

(54) INDUCTIVE TRANSDUCER WITH RECESSED LEADING POLE LAYER

(75) Inventors: Kroum Stoev, Fremont, CA (US);
Yugang Wang, Milpitas, CA (US);
Francis Liu, Fremont, CA (US);
Yingjian Chen, Fremont, CA (US);
Xiaozhong Dang, Fremont, CA (US)

(73) Assignee: Western Digital, Inc., Fremont, CA (US)

( * ) Notice: Subject to any disclaimer, the term of this patent is extended or adjusted under 35 U.S.C. 154(b) by 158 days.

(21) Appl. No.: 10/086,756

(22) Filed: Feb. 28, 2002

(51) Int. Cl.⁷ .............................................. G11B 5/147
(52) U.S. Cl. ..................................................... 360/126
(58) Field of Search ........................................ 360/126

(56) References Cited

U.S. PATENT DOCUMENTS

| | | | |
|---|---|---|---|
| 5,452,166 A | | 9/1995 | Aylwin et al. ............... 360/126 |
| 5,831,801 A | * | 11/1998 | Shouji et al. ................ 360/126 |
| 5,850,326 A | * | 12/1998 | Takano et al. ............... 360/122 |
| 5,950,301 A | | 9/1999 | Gray et al. ............... 29/603.12 |
| 6,069,015 A | | 5/2000 | Gray et al. ..................... 438/3 |
| 6,091,582 A | * | 7/2000 | Komuro et al. ............. 360/126 |
| 6,490,127 B1 | * | 12/2002 | Sasaki ......................... 360/126 |

OTHER PUBLICATIONS

IEEE Transactions on Magnetics article entitled "Off-track Performance of Thin Film Single Pole Head for Perpendicular Double-layered Media", by H. Yamada et al., vol. 34, No. 4, Jul. 1998, pp. 1468–1470.

IEEE Transactions on Magnetics article entitled "Design of Recessed Yoke Heads for Minimizing Adjacent Track Encroachment", by Y. K. Kim et al., vol. 36, No. 5, Sep. 2000, pp. 2524–2526.

IEEE Transactions on Magnetics article entitled "Slide Track Erasure of Stitched-Pole Magnetic Recording Heads", by D. Guarisco et al., vol. 36, No. 5, Sep. 2000, pp. 2527–2529.

IEEE Transactions on Magnetics article entitled "Pole Tip Recession (PTR) Measurements with High Accuracy, Precision, and Throughput", by A. V. Kulkarni et al., vol. 36, No. 5, Sep. 2000, pp. 2736–2738.

IEEE Transactions on Magnetics article entitled "Eddy-Current-Assisted Digital Video Read/Write Head", by H. A. Shute et al., vol. 37, No. 4, Jul. 2001, pp. 3043–3052.

* cited by examiner

*Primary Examiner*—David Davis
(74) *Attorney, Agent, or Firm*—Mark Lauer; Silicon Edge Law Group LLP

(57) ABSTRACT

In one aspect, an inductive transducer is disclosed having a leading pole layer and a leading pole tip, with the pole layer being further removed than the pole tip from a media-facing surface. In another aspect, an inductive transducer is disclosed having a magnetic pedestal disposed between a leading pole layer and a leading pole tip, with at least one of the pedestal and pole layer being further removed than the pole tip from a media-facing surface. In another aspect, a leading pole layer or pedestal may have a surface that slopes away from the media-facing surface with increasing distance forward from the leading pole tip.

24 Claims, 9 Drawing Sheets

INDUCTIVE TRANSDUCER WITH RECESSED LEADING POLE LAYER

BACKGROUND OF THE INVENTION

The present invention relates to electromagnetic transducers, which may for example be employed in information storage systems or measurement and testing systems.

An inductive head used for writing and/or reading magnetic information on a storage media such as a disk or tape includes electrically conductive coil windings encircled by a magnetic core including first and second pole layers. Portions of the pole layers adjacent the media are termed pole tips. The magnetic core is interrupted by a submicron nonmagnetic gap disposed between the pole tips to divert magnetic flux to the media during writing. To write to the media electric current is flowed through the coil, which produces magnetic flux in the core encircling the coil windings, the magnetic flux fringing across the nonmagnetic gap adjacent the media so as to write bits of magnetic field information in tracks on the media.

The first pole layer may also serve as a magnetic shield layer for a magnetoresistive (MR) sensor that has been formed prior to the pole layers, the combined MR and inductive transducers termed a merged head. A structure in which a magnetic shield layer is disposed adjacent to a first pole layer may be termed a piggyback head. Typically the first pole layer is substantially flat and the second pole layer is curved, as a part of the second pole layer is formed over the coil windings and insulation disposed between the pole layers, while another part nearly adjoins the first pole layer adjacent the gap. The second pole layer may also diverge from a flat plane by curving to meet the first pole layer in a region distal to the media-facing surface, sometimes termed the back gap region, although typically a nonmagnetic gap in the core does not exist at this location.

The curvature of the second pole layer from planar affects the performance of the head. An important parameter of the head is the throat height, which is the distance from the media-facing surface to the point at which the first and second pole layers begin to diverge and are separated by more than the submicron nonmagnetic gap. Because less magnetic flux crosses the gap as the pole layers are further separated, a short throat height is desirable in obtaining a fringing field for writing to the media that is a significant fraction of the total flux crossing the gap.

In addition to the second pole layer being curved from planar, one or both pole layers may also have a tapered width in the pole tip area, to funnel flux through the pole tips. The width of the pole tips, also known as the track width, may be decreased to allow more tracks to be written in a given area. As the track width is decreased, however, it becomes more difficult to efficiently funnel magnetic flux through the pole tips. A magnetic pedestal may be employed between the second pole layer and the second pole tip, in an attempt to obtain sufficient signal strength at the edge of the second pole tip adjacent the gap, which writes to the media.

SUMMARY

In one aspect, an inductive transducer is disclosed having a leading pole layer and a leading pole tip, with the pole layer being further removed than the pole tip from a media-facing surface. In another aspect, an inductive transducer is disclosed having a magnetic pedestal disposed between a leading pole layer and a leading pole tip, with at least one of the pedestal and pole layer being further removed than the pole tip from a media-facing surface. In another aspect, a leading pole layer or pedestal may have a surface that slopes away from the media-facing surface with increasing distance forward from the leading pole tip. This summary merely lists a few waspects of the disclosure while the invention is defined by the claims appended below.

DETAILED DESCRIPTION OF THE PREFERRED EMBODIMENTS

Figure 1:
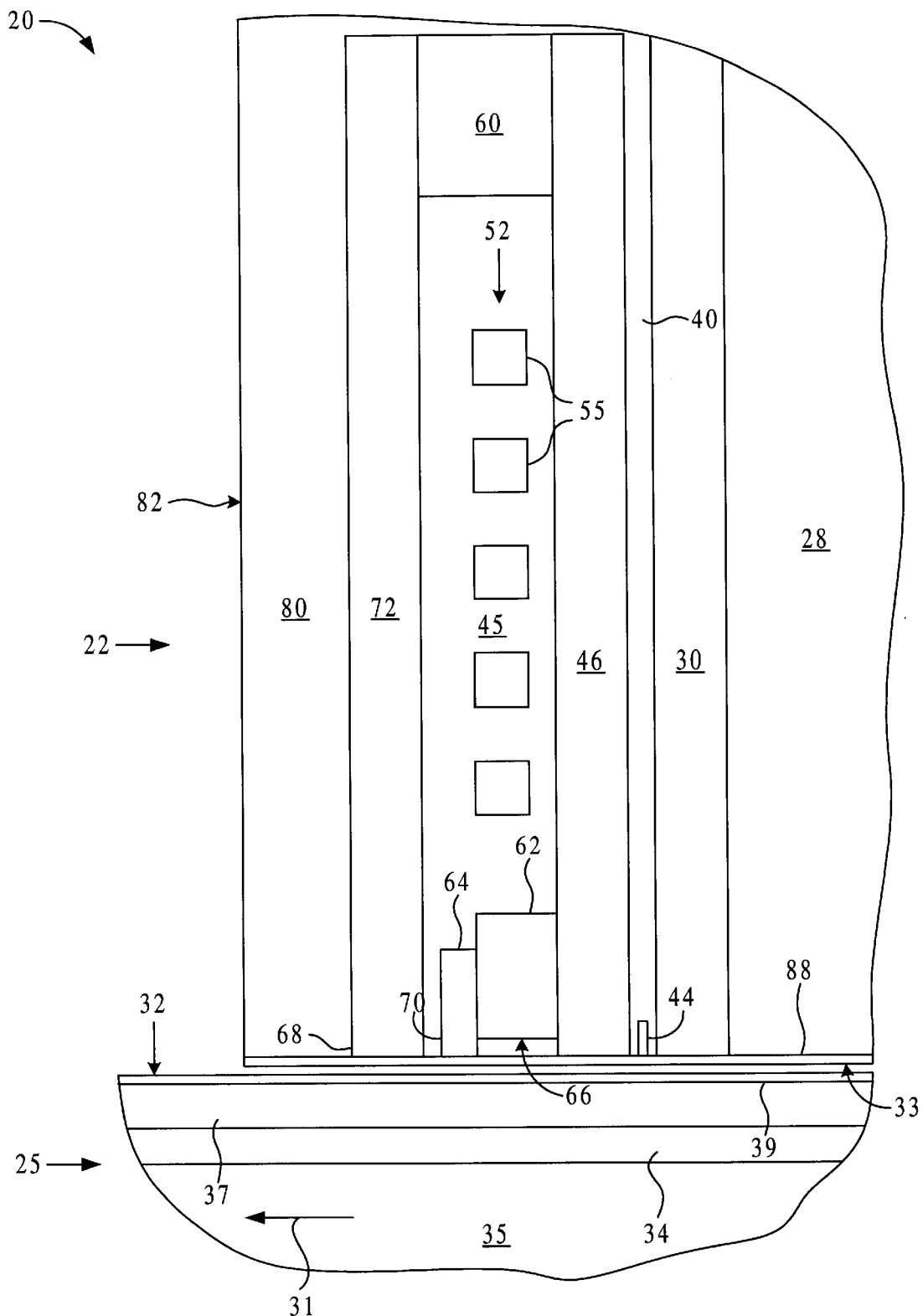
FIG. 1 is a cutaway cross-sectional view of a portion of an information storage system in accordance with one embodiment.

FIG. 1 depicts a cutaway cross-section of a portion of an information storage system 20. A portion of an electromagnetic head including a merged inductive and MR transducer 22 is depicted in close proximity to a relatively moving media such as a spinning disk 25. The transducer 22 is formed in a plurality of adjoining solid layers on a wafer substrate 28 that may remain affixed to the transducer 22. A media-facing surface 33 of the solid body that includes the transducer 22 may be formed with a desired relief for fluid and solid interaction with the disk 25, and the body may be termed a head or slider.

The disk 25 may be conventional and includes a self-supporting substrate 35, an underlayer 34, a media layer 37 and a protective overcoat 39. The disk 25 is spinning in a direction indicated by arrow 31 and has a surface 32 adjacent the media-facing surface 33 of the head.

Atop the slider substrate 28 a first low-coercivity, high-permeability or "soft magnetic" shield In layer 30 has been formed, for example of Permalloy ($Ni_{0.8}Fe_{0.2}$), either directly or atop a seed layer, not shown. A first layer of nonmagnetic, electrically insulating material is disposed on the shield layer, adjoining a magnetoresistive (MR) sensor 44. The MR sensor can be any sensor that utilizes a change in resistance associated with a change in magnetic field to sense that field, which may be measured as a change in current or voltage across the sensor. MR sensors include anisotropic magnetoresistive (AMR) sensors, spin-valve (SV) sensors, spin-dependent tunneling (SDT) sensors, giant magnetoresistive (GMR) sensors and colossal magnetoresistive (CMR) sensors.

A second layer of nonmagnetic, electrically insulating material is disposed between the MR sensor and a second soft magnetic shield layer, which also serves as a first or leading pole layer 46 in this example of a merged head. The first and second layers of nonmagnetic, electrically insulating material are indicated together as region 40. The MR sensor 44 may be electrically connected to the shield layers 30 and 46 in some embodiments, such as spin-dependent tunneling sensors.

An electrically conductive coil layer 52 has first coil sections 55 that are separated from the first pole layer 46 by additional nonmagnetic, electrically insulating material 45. The coil sections 55 are substantially parallel in the cross-section shown, and coil layer 52 spirals about a magnetically soft back gap stud 60, extending away from the media-facing surface in an area outside that shown in FIG. 1. Additional coil layers may optionally be formed. A magnetically soft leading pedestal 62 couples leading pole layer 46 to a magnetically soft leading pole tip 64. The leading pedestal 62 is further removed than the leading pole tip 64 from the media-facing surface 33, as shown by recessed surface 66.

A magnetically soft trailing pole layer 72 has a trailing pole tip 68 that is magnetically coupled to leading pole tip 64, the pole tips separated by a submicron nonferromagnetic gap layer 70. Trailing pole layer 72 is also coupled to the back gap stud 60, so that pole layer 46, back gap stud 60, leading pedestal 62, leading pole tip 64, trailing pole tip 68 and trailing pole layer 72 form a magnetic loop substantially encircling and electrically isolated from coil sections 55. A protective coating 80 forms a trailing edge 82 of the body, while another protective coating 88 forms the media-facing surface 33.

Pole tip 64, pole tip 68 and pedestal 62 may be made of high moment material, also called high magnetic saturation material or high $B_S$ material, to avoid saturation during writing. High $B_S$ materials currently have a saturation moment of at least 18 kG. For example, the pedestal 62 may be made of sputtered, laminated high $B_S$ material, such as laminated CoFeN having a moment $B_S$ of about 24 kG. Alternative high $B_S$ materials include FeXN, where X is an element selected from a group including Rh, Al, Ta, Zr and Ti, having a $B_S$ of about 20 kG–22 kG. Other high $B_S$ materials known or developed may alternatively be employed in pole tips 64 and 68 and pedestal 62. For the case in which one or more of these layers are mulaminated, plural layers of high $B_S$ material may be interspersed with at least one layer of lower $B_S$ material or nonmagnetic material that is either electrically conductive or not electrically conductive. The pedestal 62 may have a tapered base that provides for increased flux transfer between pole tip 64 and pole layer 46.

Figure 2:
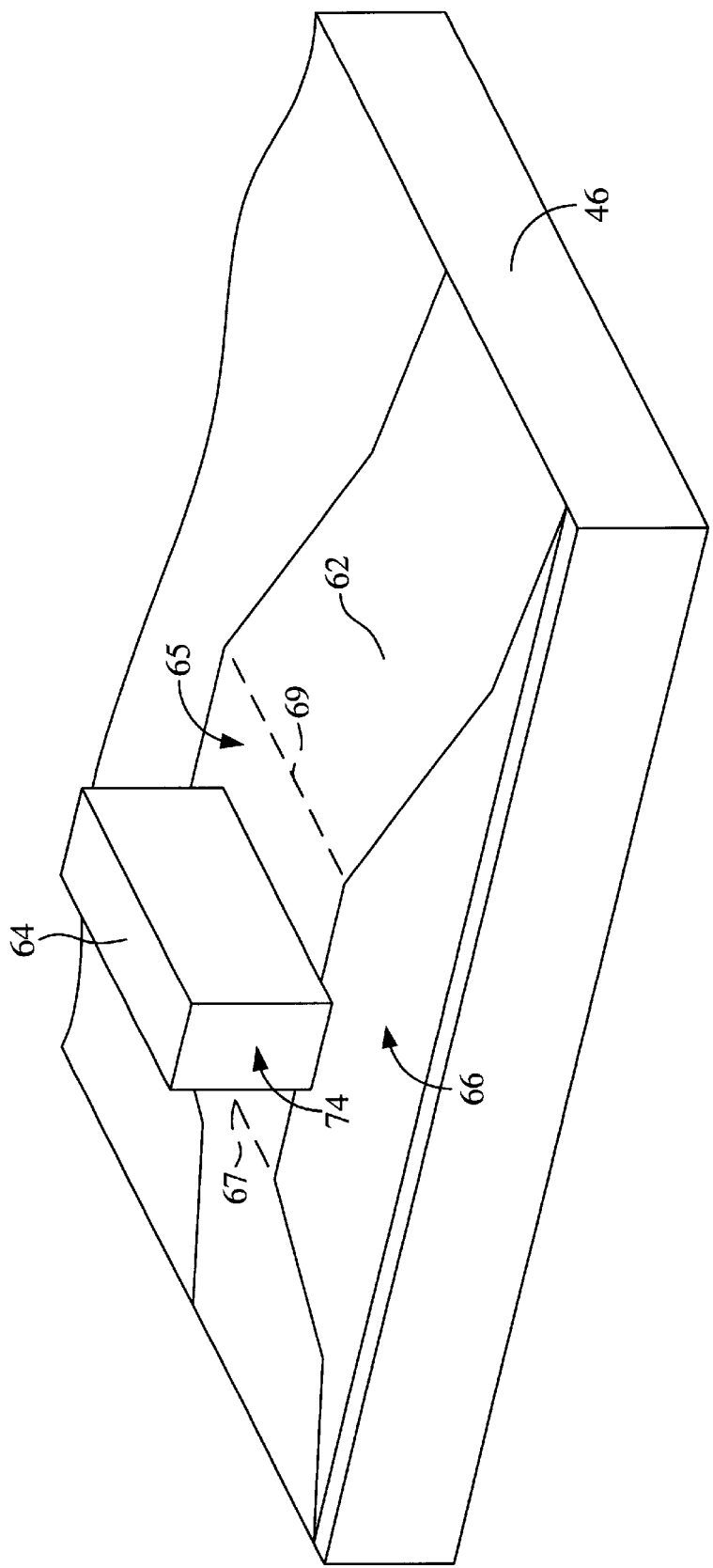
FIG. 2 is perspective view of some elements from FIG. 1.

FIG. 2 is a cutaway perspective view of leading pole layer 46, pedestal 62 and leading pole tip 64. The tapered shape of pedestal 62 is evident in this perspective view, as is the recess of pedestal surface 66 compared to media-facing surface 74 of the pole tip 64. Pedestal 62 in this embodiment has a flat surface or plateau 65 upon which the leading pole tip 64 has been formed. Although leading pole tip 64 is shown in this figure to have walls that have been trimmed to be substantially perpendicular to media-facing surface 74, in alternative embodiments the walls may taper, for example in a "V" shape, to be narrowest at surface 74.

Corners 67 and 69 are formed between the plateau 65 and the sloping sides of the pedestal 62. It was discovered by the present inventors that the corners 67 and 69 funneled magnetic flux to the trailing pole tip layer or the trailing pole layer, not shown, despite the much larger distance between the corners 67 and 69 and those trailing layers than the distance between the pole tips. This channeling of magnetic flux through corners 67 and 69 caused that flux to partly write or erase tracks on the media adjacent to the track being written by the pole tips, leading to errors. One way to reduce those errors is to position pedestal 62 further from the media-facing surface than is pole tip 64, as shown by pedestal surface 66.

Figure 3:
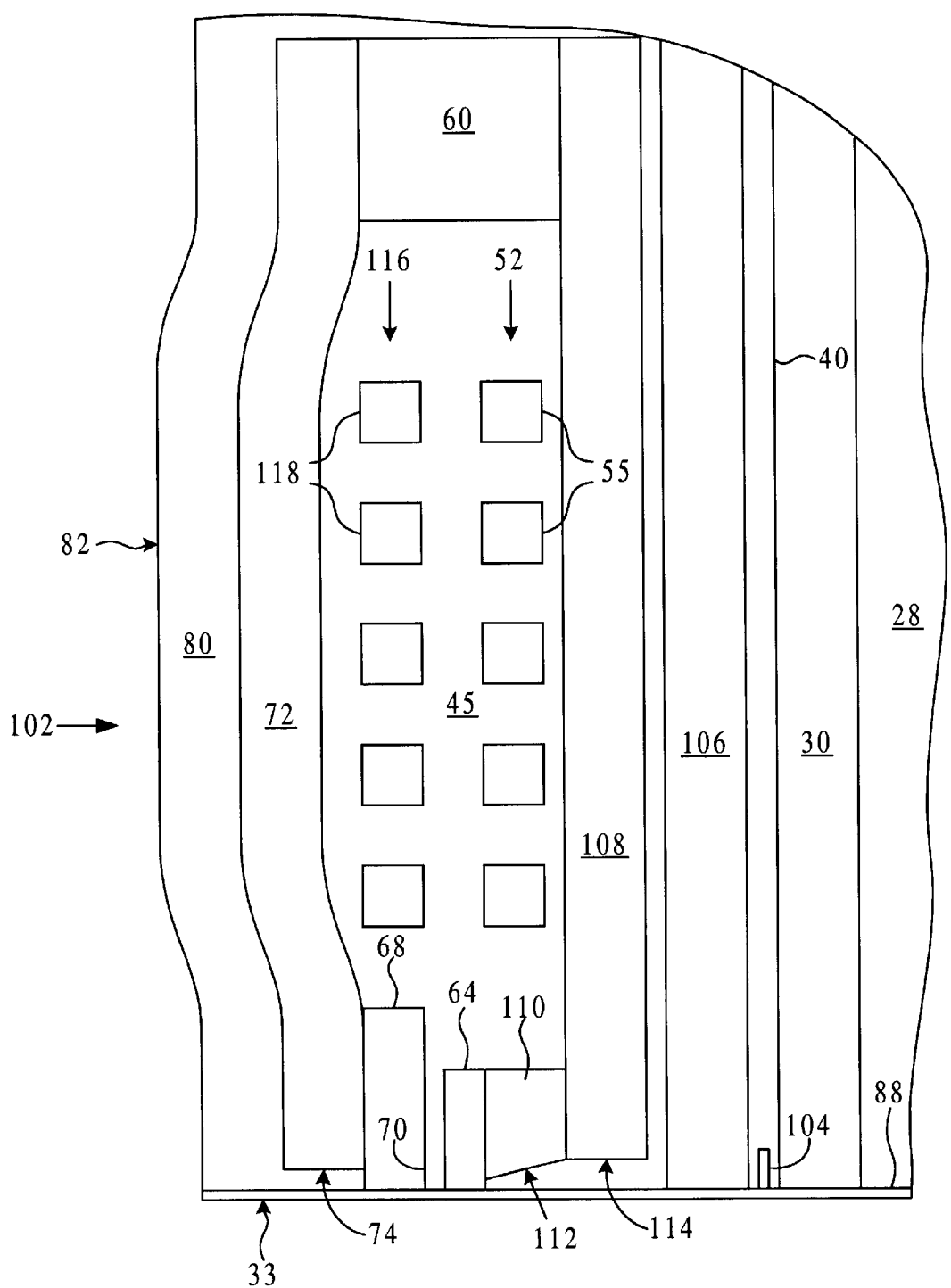
FIG. 3 is a cutaway cross-sectional view of a portion of a transducer in accordance with another embodiment.

FIG. 3 is a side view of a piggyback head embodiment 102 in which a MR sensor 104 has a shield layer 106 that is separate from a first pole layer 108 of an inductive transducer. For convenience, elements that are substantially unchanged from the embodiment shown in FIG. 1 are labeled similarly in FIG. 3. In the embodiment shown in FIG. 3, a pedestal 110 that couples the first pole layer 108 to the first pole tip 64 has a surface 112 that slopes away from the media-facing surface with increasing distance from the first pole tip 64.

Sloping surface 112 allows more flux to be passed between first pole layer 108 and first pole tip 64, because pedestal 110 is tapered oppositely in the cross section shown in FIG. 3 than in a perpendicular dimension, such as that shown in FIG. 2. Thus an area through which flux passes in traveling between first pole layer 108 and first pole tip 64 does not decrease as rapidly as if the surface 112 were parallel to the media-facing surface 33. Pedestal 110 can be shaped to smoothly transform from extending furthest in a dimension parallel to the media-facing surface 33, in a cross-section adjoining the first pole layer 108, to extending furthest in a dimension perpendicular to the media-facing surface 33, in a cross-section adjoining the pedestal 110. This shape can increase the magnetic flux transferred between the first pole layer 108 and the first pole tip 64. Moreover, sloping surface 112 allows flux in the pedestal 110 to be closer to the media-facing surface 33 and the media, not shown in this figure, increasing the flux in the pole tip 64 adjacent the media and therefore increasing the write signal. At the same time, corners such as corners 67 and 69 shown in FIG. 2 are removed from the media-facing surface 33 and so flux from such corners that overwrite id adjacent tracks is reduced.

First pole layer 108 also has a surface 114 that is further removed than that of the first pole tip 64 from the media-facing surface 33, although it is also possible for surface 114 to be flush with that of the first pole tip 64. It is also possible, particularly in an embodiment in which a first pole layer terminates coplanar with a first pole tip, for a first pedestal to have a surface that slopes away from the media-facing surface with decreasing distance from the first pole tip. In this embodiment corners such as corners 67 and 69 shown in FIG. 2 are further removed from the media-facing surface 33 and so flux from such corners that overwrite adjacent tracks is reduced.

For the illustrated situation in which the first pole layer 108 is further removed than the first pole tip 64 from the media-facing surface 33, the first pole layer 108 may be flush with the pedestal 110 at the junction at which the layers join. For the situation in which the first pole layer 108 is not further removed than the first pole tip 64 from the media-facing surface 33, the absence of corners in first pole layer 108 that are close to the trailing pole tip 68, as well as the separation of first pole layer 108 from pole tip 68 due to pedestal 110, allows first pole layer 108 to terminate parallel with first pole tip 64 without erasing adjacent media tracks.

The head 102 in FIG. 3 contains a second coil layer 116 that is connected to first coil layer 52 via an interconnect section, not shown. Second coil layer 116 has Act winding sections 118 that are substantially parallel to winding sections 55. In order for current in winding sections 118 to flow in the same direction as current in winding sections 55, coil layer 116 may spiral in an opposite direction from coil layer 52, with the interconnect section connecting the innermost winding sections of layers 52 and 116. Alternatively, coil layer 116 may spiral in an opposite direction from coil layer 52, with the interconnect section connecting the outermost winding sections of layers 52 and 116. Thus, a current spiraling inward along coil layer 52 spirals outward along coil layer 116, with the direction of the current in winding sections 55 and 118 substantially parallel.

Figure 4:
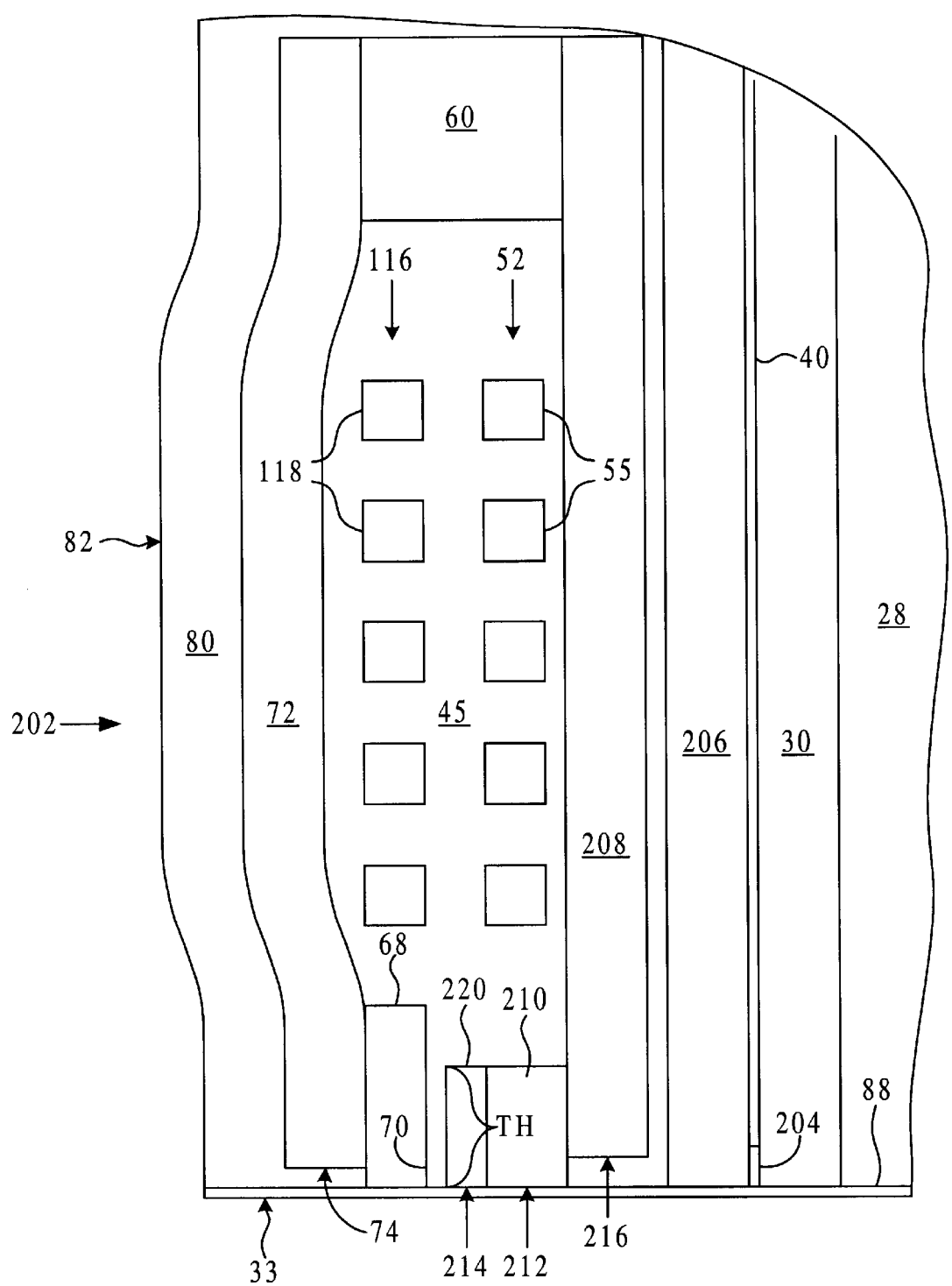
FIG. 4 is a cutaway cross-sectional view of a portion of a transducer in accordance with another embodiment.

FIG. 4 is a side view of a piggyback head embodiment 202 in which a spin-dependent tunneling (SDT) MR sensor 204 has a shield layer 206 that is separate from a first pole layer 208 of an inductive transducer. For convenience, elements that are substantially unchanged from the embodiment shown in FIG. 1 are labeled similarly in FIG. 4. In the embodiment shown in FIG. 4, a pedestal 210 that couples the first pole layer 208 to the first pole tip 220 has a surface 212 that is as close to the media-facing surface as is a surface 214 of a first pole tip 220. The first pole layer 208, however, has a surface 216 that is further removed than surfaces 212 and 214 from the media-facing surface 33.

Similar to previously described embodiments, the second pole tip 68 is disposed adjacent the media-facing surface 33 and the second pole layer 72, the second pole tip 68 separated from the first pole tip 220 by a submicron nonmagnetic gap 70. A throat height TH is defined by the first pole tip 220, allowing the throat height TH to be made small for high performance. The height TH may be less than a micron, for example. The second pole tip 68 extends further than the first pole tip 220 from the media-facing surface 33, allowing the second pole layer 72 to overlap the second pole tip 68 in a relatively large area for transfer of flux between the pole tip 68 and pole layer 72. Second pole layer 72 terminates further from the media-facing surface 33 than does second pole tip 68, to reduce the possibility of writing to a media layer with the second pole layer 72 instead of or in addition to the second pole tip 68. All of or a layer of the second pole tip 68 adjoining the gap 70 may be made of high $B_S$ material to avoid saturation of the pole tip 68 during writing. Second pole tip 68 may also be made of plural layers of high $B_S$ material with at least one interspersed layer of lower $B_S$ material or nonmagnetic material that is either electrically conductive or not electrically conductive.

Although FIG. 4 depicts a SDT sensor in a piggyback head and FIG. 1 depicts a SV sensor in a merged head, the converse combinations are also possible, as well as other head/sensor combinations. For example, a magnetic field sensor can be disposed closer than the inductive transducer to the trailing end.

Figure 5:
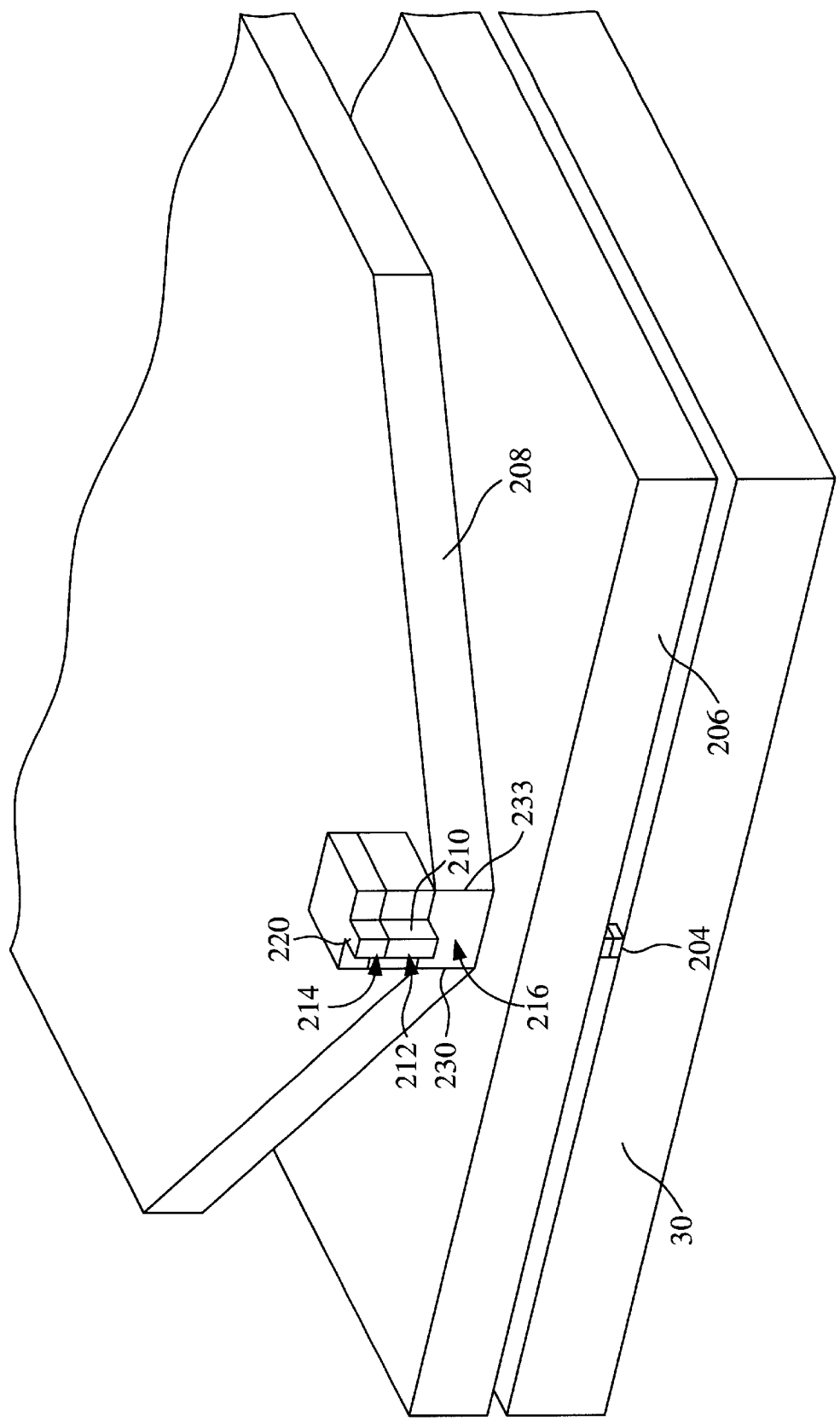
FIG. 5 is perspective view of some elements from FIG. 4.

FIG. 5 is a cutaway perspective view of magnetic elements such as first shield layer 30, SDT sensor 204, second shield layer 206, leading pole layer 208, pedestal 110 and leading pole tip 220. The trimmed shape of pedestal 110 and pole tip 220 is evident in this perspective view, as is the recess from the media facing surface of leading pole layer surface 216 compared with first pedestal surface 212 and first pole tip surface 214. Corners 230 and 233 of leading pole layer 208 are located further from the media-facing surface than is pole tip 220, averting side writing by those corners.

Figure 6:
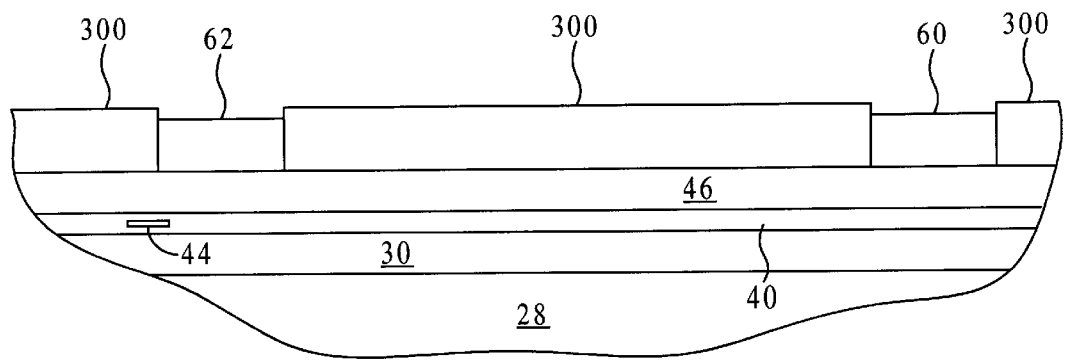
FIG. 6 is a cutaway cross-sectional view of a step in the fabrication of a transducer for the information storage system of FIG. 1.

FIG. 6 shows some initial steps in forming the transducer 22 of FIG. 1. The transducer 22 is formed along with thousands of similar transducers, not shown, on the wafer substrate 28, which may be made of alumina-titanium-carbide (Altic), alumina, SiC or other known materials. Atop the wafer substrate 28 the first soft magnetic shield layer 30 is formed, for example by electroplating within a mask over a conductive layer, either directly on the substrate or atop a seed layer, not shown. An alumina or other dielectric layer, not shown, is then deposited and lapped to form a coplanar surface with the first shield layer 30, for example by chemical-mechanical polishing (CMP).

A first submicron read gap layer of nonmagnetic, electrically insulating material is formed on the shield layer 30, followed by MR sensor 44. Although shown as a single element in this figure, the MR sensor may be composed of plural layers, and electrical leads for the MR sensor 44 may extend between the shields 30 and 46 toward and away from the viewer, as known in the art. A second submicron read gap layer of nonmagnetic, electrically insulating material is then formed between the MR sensor 44 and the shield/pole layer 46. The first and second layers of nonmagnetic, electrically insulating material, as well as additional layers of such material, are indicated together as region 40. For the situation in which a piggyback head having separate second shield and first pole layers is desired, a dielectric layer (e.g., alumina or silicon dioxide) is sputtered on the second shield layer, followed by sputtering and electroplating the first pole layer, for example of permalloy.

After lapping the shield/pole layer 46 and a dielectric layer that forms a flat surface with the shield/pole layer 46, a photoresist mask 300 is defined. The magnetic stud 60 and the first pedestal 62 are then formed on the shield/pole layer 46 by electroplating. The mask 300 is designed to terminate pedestal 62 further than the MR sensor 44, for example, from what will become the media-facing surface.

Figure 7:
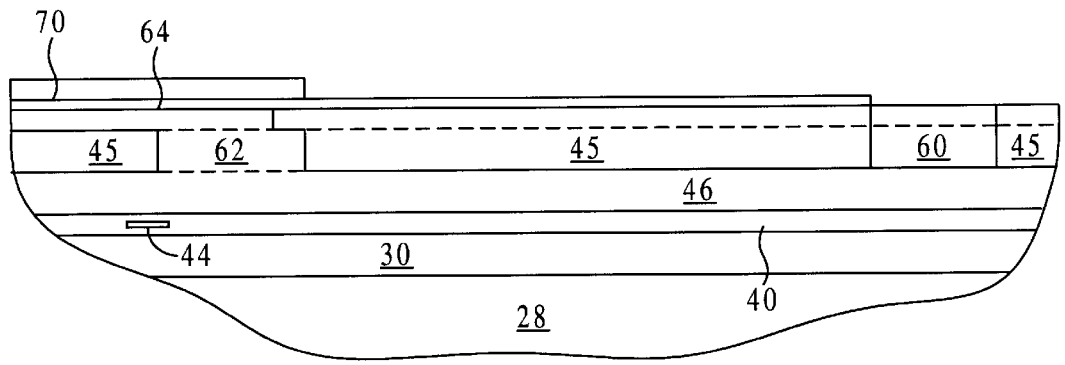
FIG. 7 is a cutaway cross-sectional view of another step in the fabrication of the transducer subsequent to that shown in FIG. 6.

In FIG. 7, after removal of resist 300, a dielectric material 45 is sputter-deposited, for example of alumina or silicon dioxide. The dielectric material 45, magnetic stud 60 and first pedestal 62 are then polished to form a flat surface, upon which first pole tip layer 64 is sputter-deposited and a mask defining an edge of that layer 64 is lifted off. First pole tip layer 64 can be formed of a single layer of sputtered, high $B_S$ material, or can be formed of a sputtered layer, for example of permalloy, upon which a high $B_S$ material, for example $Ni_{0.45}Fe_{0.55}$ is electroplated. Alternatively, first pole tip layer 64 may formed of a plurality of layers of sputtered, high $B_S$ material, such as CoFeN or FeXN, where X is an element selected from a group including Rh, Al, Ta, Zr and Ti, interspersed with at least one layer of magnetic material such as Permalloy, conductive nonmagnetic material such as Cr or Ti, or dielectric material such as alumina or AlN. The magnetic layers forming first pole tip layer 64 can each have a thickness in a range between a single atomic layer and a micron, while the overall thickness of the pole tip layer 64 is generally less than a few microns. In one embodiment, instead of defining an end of the first pole tip layer 64 with a lift off mask, the end can be defined with an ion beam or other directional etching.

The submicron nonferromagnetic gap layer 70 is then sputter-deposited, for example of alumina or silicon dioxide, and optionally polished. Second pole tip layer 68 is then formed on the gap layer 70. Second pole tip layer 68 can be formed of a single layer of sputtered, high $B_S$ material, or can be formed of a sputtered layer of high $B_S$ material upon which a high $B_S$ material, for example $Ni_{0.45}Fe_{0.55}$ is electroplated. Alternatively, first pole tip layer 64 may formed of a plurality of layers of sputtered, high $B_S$ material, such as CoFeN or FeXN, where X is an element selected from a group including Rh, Al, Ta, Zr and Ti, interspersed with at least one layer of magnetic material such as permalloy, conductive nonmagnetic material such as Cr or Ti, or dielectric material such as alumina or AlN. In an alternative embodiment in which the gap layer 70 is formed of electrically conductive nonmagnetic material, for example of Ti or Cr, the second pole tip layer 68 may be electroplated directly atop the gap layer 70. The magnetic layers forming second pole tip layer 68 can each have a thickness in a range between a single atomic layer and a micron, while the overall thickness of the pole tip layer 68 is generally less than a few microns. The second pole tip layer 68 is then masked and trimmed by ion beam etching (IBE) to define the track width of that layer, the etching extending through the gap layer 70 to define the first pole tip 64 as well. In one embodiment, instead of defining an end of the second pole tip layer 68 with a lift off mask, the end can be defined during this ion beam etching.

Figure 8:
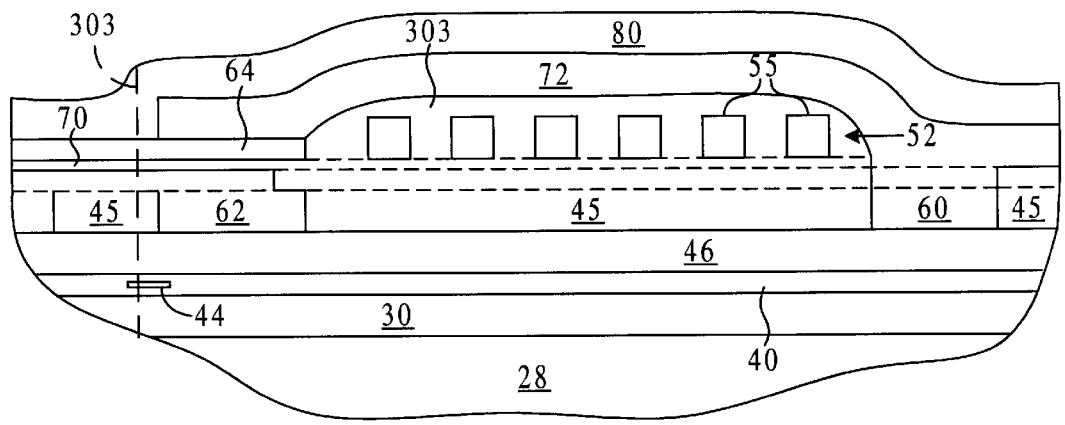
FIG. 8 is a cutaway cross-sectional view of another step in the fabrication of the transducer subsequent to that shown in FIG. 7.

As shown in FIG. 8, coil layer 52 is then formed by sputtering a seed layer, forming a mask through which the coil sections 55 are electroplated, and removing the mask and the seed layer it covered by chemical and ion beam etching, respectively. The coil layer 52 may be tested at this time. Photoresist 303 is then deposited between the coil sections 55, and baked to harden. Instead of or in addition to the hardbaked photoresist 303, an inorganic dielectric such as silicon dioxide or alumina may be formed on or between the coil sections 55.

Second pole layer 72 is then stitched to second pole tip layer 68 by sputtering and electroplating, after which protective coating 80 is formed on what will become the trailing edge 82 of the body. The wafer substrate 28 and adjoining thin film layers are then cut into many rows along lines including line 308, each of the rows containing multiple transducers like transducer 22. The rows are then polished along lines including line 308, which will after deposition of protective coating 88, not shown in this figure, become the media-facing surface 33.

Figure 9:
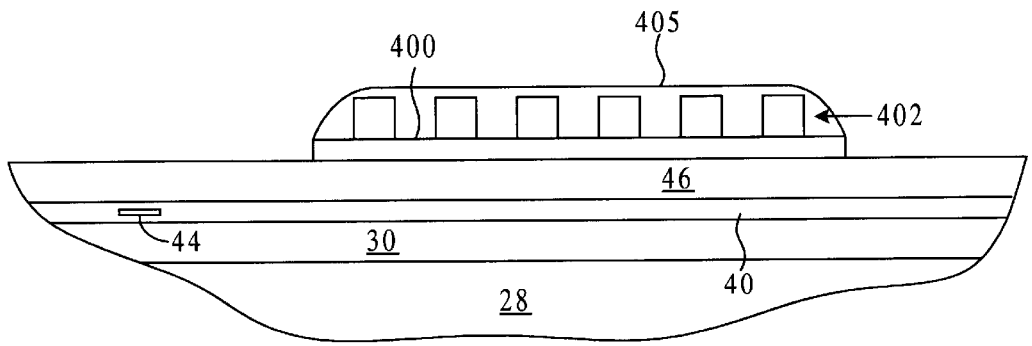
FIG. 9 is a cutaway cross-sectional view of a step in the fabrication of a transducer for the information storage system of FIG. 1.

FIG. 9 shows some initial steps in forming a transducer having a recessed first pedestal layer 64 like transducer 22 of FIG. 1, but which differs in part by having a flat second pole layer instead of the curving second pole layer 72 described above. The initial steps described above with regard to FIG. 6 may be followed to create a MR sensor and merged first pole shield layer 46. Note that it is possible in this and other embodiments to form an inductive portion of a transducer first and a magnetoresistive sensor atop the inductive transducer.

Upon the shield/pole layer 46 a dielectric layer 400 is formed, for example by sputter deposition of alumina or silicon dioxide through a mask that is then chemically removed so that excess dielectric material on the mask is lifted off. A coil layer 402 is then formed by sputtering a seed layer, forming a mask through which the coil sections 55 are electroplated for example of copper, and removing the mask and the seed layer it covered by chemical and ion beam etching, respectively. Photoresist mask 405 is then formed and baked around the coil layer 402. The coil layer 402 may be tested at this time.

Figure 10:
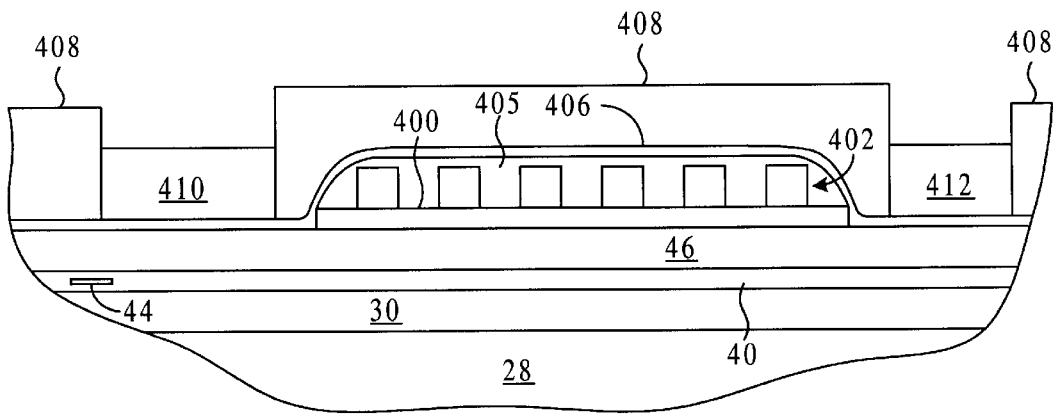
FIG. 10 is a cutaway cross-sectional view of another step in the fabrication of the transducer subsequent to that shown in FIG. 9.

In FIG. 10, a conductive seed layer 406 has been deposited, and another photoresist mask 408 formed to define a magnetic pedestal 410 and magnetic back gap stud 412. The pedestal 410 and back gap stud 412 are then electroplated, after which yet another mask can be formed over a central portion of the pedestal and all of the stud to create a tapered shape for the pedestal by IBE. The mask is then chemically removed and the part of the seed layer 406 that is not covered by the pedestal 410 or the back gap stud 412 is removed by further IBE. Alternatively, tapering of the pedestal 410 can be accomplished by IBE of the trailing and leading pole tips, such that shadowing from the pole tips causes parts of the pedestal close to the pole tips to be removed less than parts of the pedestal further from the pole tips.

Figure 11:
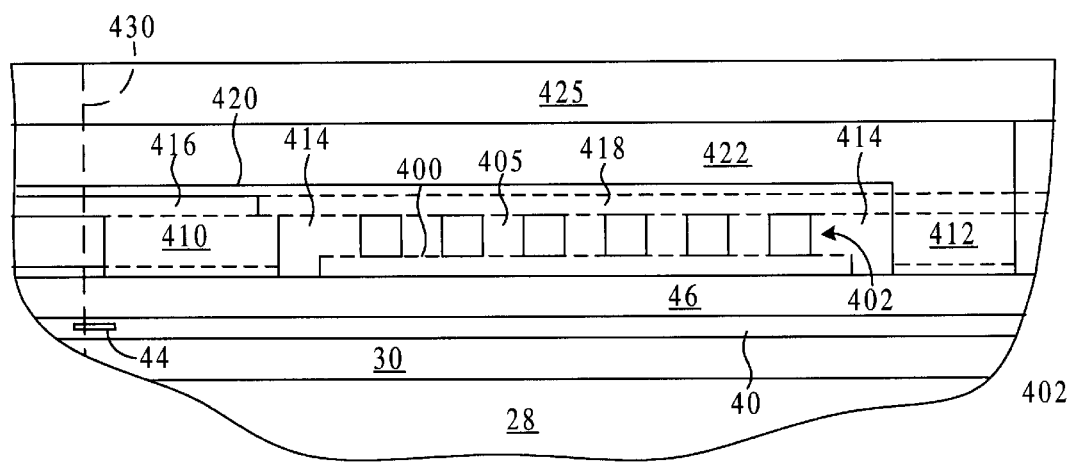
FIG. 11 is a cutaway cross-sectional view of another step in the fabrication of the transducer subsequent to that shown in FIG. 10.

Referring to FIG. 11, after depositing a hard dielectric 414 to fill in spaces between coil layer 402, pedestal 410 and stud 412, those layers are polished to a flat surface upon which a first pole tip 416 is sputtered. After a lift off mask that defines the throat height has been removed and an inorganic dielectric layer 418 deposited, the first pole tip 416 and dielectric layer 418 are polished, and a nonferromagnetic submicron write gap 420 is formed. A second pole tip layer 422 is then formed by sputtering high $B_S$ material, such as CoFeN or FeXN, where X is an element selected from a group including Rh, Al, Ta, Zr and Ti, followed by electroplating a layer of magnetic material such as permalloy. Pole tip layer 422 is then trimmed by an IBE that, as mentioned above, also trims pole tip layer 416 and creates a tapered leading pole tip 410. A protective coating 425 is formed, for example of alumina, after which the wafer will be diced into rows of transducers, for example along line 430, which will be polished and prepared into the media-facing surface.

Figure 12:
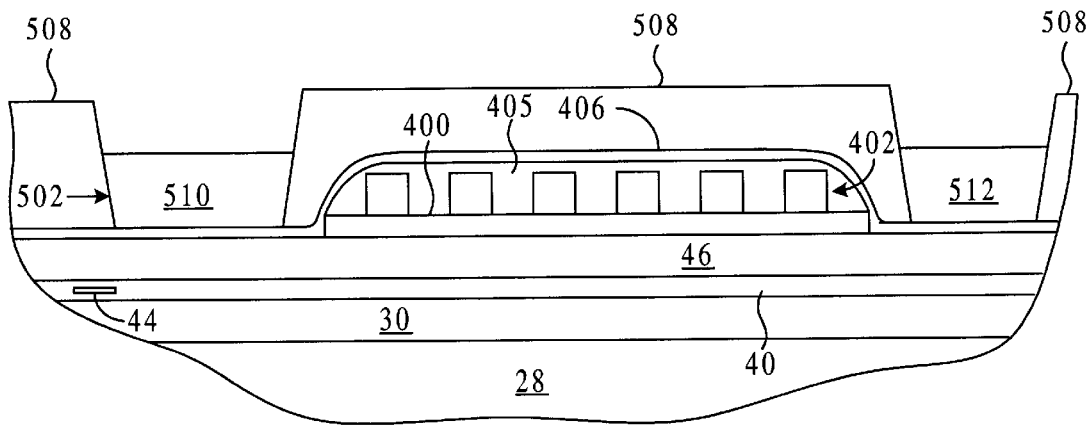
FIG. 12 is a cutaway cross-sectional view of a step in the fabrication of a transducer for the information storage system of FIG. 3.

FIG. 12 shows some steps in forming a transducer having a first pedestal layer 510 with a sloped media-facing surface 502 like first pedestal layer 110 shown in FIG. 3. Formation of the coil layer 402, photoresist layer 405, seed layer 406 and prior layers can be similar to that described above. A positive photoresist mask 508 is formed and then baked to define sloping sides for a magnetic pedestal 510 and magnetic back gap stud 512. The pedestal 510 and back gap stud 512 are then electroplated, after which yet another mask, not shown, can be formed over a central portion of the pedestal and all of the stud to create a tapered shape for the pedestal by IBE. That mask is then chemically removed and the part of the seed layer 406 that is not covered by the pedestal 410 or the back gap stud 412 is removed by further IBE. Further processing can occur as described above with regard to other embodiments.

Figure 13:
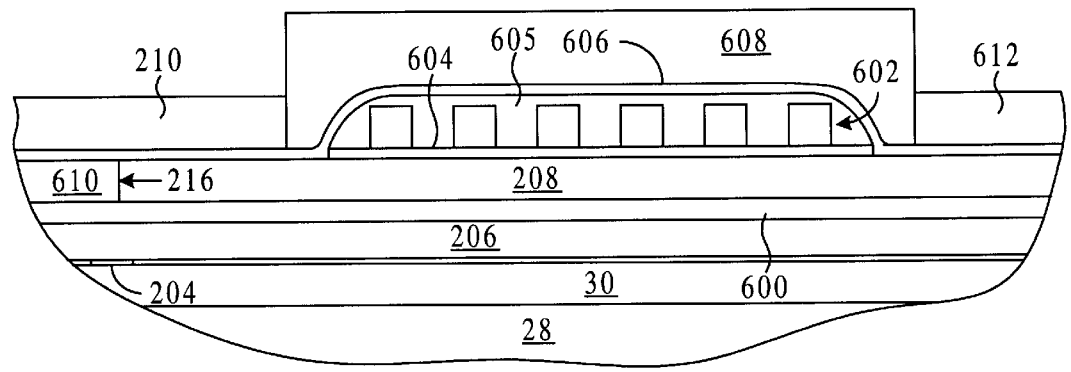
FIG. 13 is a cutaway cross-sectional view of a step in the fabrication of a transducer for the information storage system of FIG. 4.

FIG. 13 shows some steps in forming a transducer having a first pole layer 208 further removed than a first pole tip 220 from a media-facing surface, like that shown in FIG. 4. The initial processing is somewhat similar to that described above, although a spin dependent tunneling transducer 204 is first formed in the presently described embodiment. A second soft magnetic shield 206 is formed that is separated from the first pole layer 208 by a dielectric layer 600, which may be formed of sputtered alumina or silicon dioxide, for example. The first pole layer 208 is formed atop the dielectric layer 600 by sputtering a seed layer, forming a photoresist mask over the seed layer and electroplating with permalloy so that edge 216 is defined by the mask. After removing the mask and the seed layer not covered by the first pole layer 208, a dielectric filler layer 610 is formed of sputtered alumina or silicon dioxide, for example, and then the dielectric layer is polished by CMP to form a flat surface with the first pole layer 208.

A coil layer 602 is then formed and tested atop another dielectric layer 604, photoresist 605 is deposited between the coil sections and baked, and a conductive seed layer 606 is sputtered. A photoresist mask 608 is then formed over the coil area and other areas where magnetic material is not desired, and the first pedestal 210 and a portion 612 of the back gap stud are electroplated.

Figure 14:
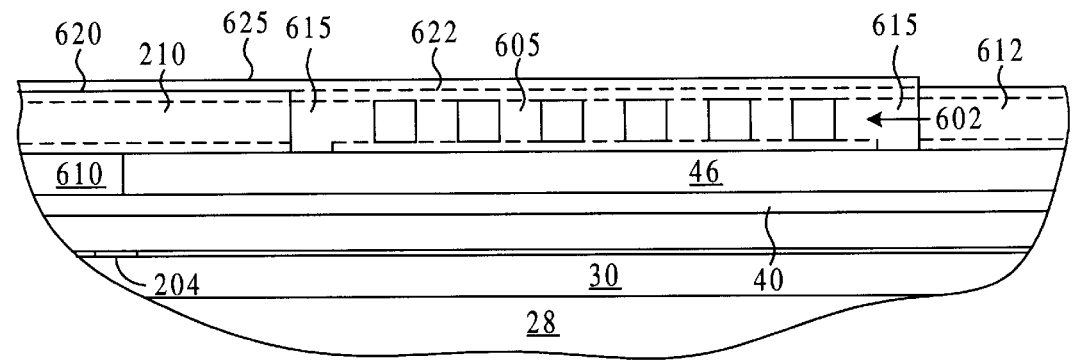
FIG. 14 is a cutaway cross-sectional view of another step in the fabrication of the transducer subsequent to that shown in FIG. 13.

In FIG. 14, the mask 608 has been chemically removed, the exposed portion of the seed layer removed by IBE and a dielectric filler 615 deposited and polished to form a flat surface with the first pedestal layer 210. A lift off mask is then formed and a layer or plurality of layers of high $B_s$ material is then sputtered on the flat surface to form a first pole tip 620. A dielectric layer 622 is then formed to fill where the pole tip layer 620 terminates, and then a submicron nonferromagnetic gap 625 is formed.

Figure 15:
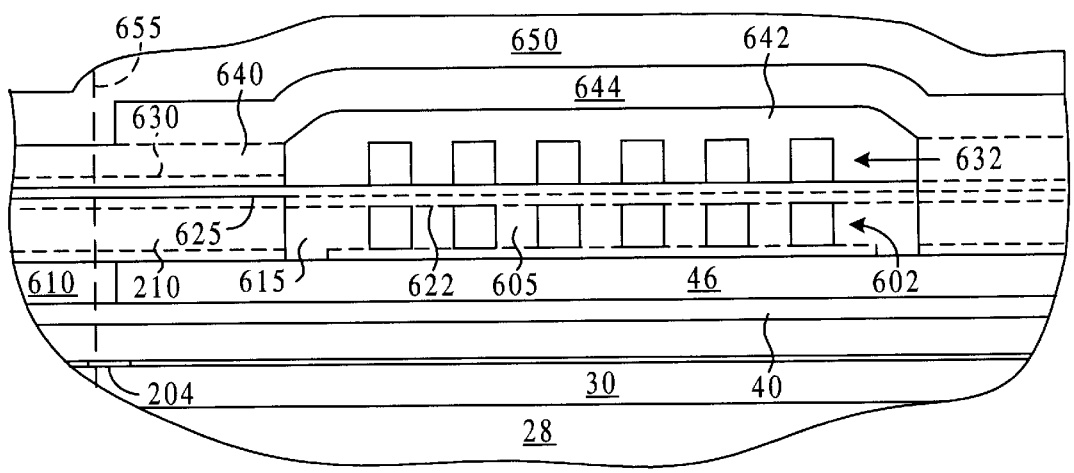
FIG. 15 is a cutaway cross-sectional view of another step in the fabrication of the transducer subsequent to that shown in FIG. 14.

In FIG. 15, a second coil layer 632 has been formed much as described above. The second coil layer 632 as well as first coil layer 602 may be tested at this time. A second pole tip layer 630 has been sputtered of high $B_s$ material, with another layer 640 or plurality of layers including high $B_s$ layers sputtered or electroplated. A mask is then formed over second pole tip layer 640 and that pole tip is trimmed by an IBE that extends to trim the first pole tip 210 as well, creating self-aligned pole tips like those shown in FIG. 5. An insulator layer 642 is then deposited and cured around the coil layer 632. A second or trailing pole layer 644 is electroplated over second pole tip layer 640. The trailing pole layer 644 is defined by a mask so that the trailing pole layer 644 terminates further than the second pole tip layers 630 and 640 from what will become the media-facing surface. After a protective overcoat layer is formed, the wafer including the layers shown in FIG. 15 is cut along line 655, which will be worked to form the media-facing surface.

Although we have focused on teaching the preferred embodiments of an improved electromagnetic transducer, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

What is claimed is:

1. A device comprising:
    a solid body having a leading end, a trailing end, and a media-facing surface;
    an electrically conductive coil disposed in said body and including a plurality of adjacent coil sections oriented substantially parallel to each other; and
    a magnetic loop substantially encircling and electrically isolated from said coil sections, said loop including first and second ferromagnetic pole tips that are disposed adjacent to said media-facing surface and separated from each other by a submicron nonferromagnetic gap, said second pole tip being disposed closer than said first pole tip to said trailing end, said loop including a first ferromagnetic pole layer and a second ferromagnetic pole layer that are both disposed further than said first pole tip from said trailing end, said second pole layer disposed between said first pole layer and said first pole tip, wherein at least one of said first and second pole layers is separated from said media-facing surface by a distance greater than that between said first pole tip and said media-facing surface.

2. The device of claim 1, wherein said second pole layer is separated from said media-facing surface by a distance greater than that between said first pole tip and said media-facing surface.

3. The device of claim 1, wherein said first pole layer is separated from said media-facing surface by a distance greater than that between said first pole tip and said media-facing surface.

4. The device of claim 3, wherein said first pole tip and said second pole layer have a substantially identical width in a direction that is substantially parallel to said media-facing surface and substantially parallel to an elongate dimension of said gap.

5. The device of claim 1, wherein said second pole layer has a surface closest to said media-facing surface that slopes away from said media-facing surface from said first pole tip to said first pole layer.

6. The device of claim 1, wherein said loop includes a third ferromagnetic pole layer disposed closer than said second pole tip to said trailing end and separated from said media-facing surface by a distance greater than that between said first pole tip and said media-facing surface.

7. The device of claim 1, wherein said at least one of said pole tips includes a high magnetic saturation material adjoining said gap.

8. The device of claim 1, further comprising a magnetic field sensor disposed adjacent to said media-facing surface.

9. A device comprising:
    a solid body having a leading end, a trailing end and a media-facing surface, said leading end separated from said trailing end in a first direction;
    an electrically conductive coil disposed in said body and including a plurality of adjacent coil sections oriented substantially parallel to each other, said coil extending further in a second direction perpendicular to said media-facing surface than in said first direction; and
    a magnetic loop substantially encircling and electrically isolated from said coil sections, said loop including first and second ferromagnetic pole tips that are disposed adjacent to said media-facing surface and separated by a submicron nonferromagnetic gap, said loop including a first ferromagnetic pole layer that is disposed closer than said first pole tip to said leading end, said loop including a second ferromagnetic pole layer adjoining said first pole layer, wherein said first and second pole layers are separated from said media-facing surface by a distance greater than that between said first pole tip and said media-facing surface.

10. The device of claim 9, wherein said second pole layer is separated from said media-facing surface by a distance substantially identical to that between said first pole layer and said media-facing surface.

11. The device of claim 9, wherein said first pole tip and said second pole layer have a substantially identical width in a direction that is substantially parallel to said media-facing surface and to an elongate dimension of said gap.

12. The device of claim 9, wherein said first pole layer has a surface closest to said media-facing surface that slopes away from said media-facing surface from said first pole tip in said first direction.

13. The device of claim 9, wherein said second pole layer has a surface closest to said media-facing surface that slopes away from said media-facing surface from said first pole tip to said first pole layer.

14. The device of claim 9, wherein said loop includes a third ferromagnetic pole layer adjoining said second pole tip, and said third pole layer is separated from said media-facing surface by a distance greater than that between said second pole tip and said media-facing surface.

15. The device of claim 9, wherein said at least one of said pole tips includes a high magnetic saturation material adjoining said gap.

16. The device of claim 9, further comprising a magnetic field sensor disposed adjacent to said media-facing surface.

17. A device comprising:
   a solid body having a leading end, a trailing end, and a media-facing surface, the body including a wafer substrate and an electromagnetic transducer disposed on said substrate in a number of layers of the trailing end, the transducer including
      an electrically conductive coil including a plurality of adjacent coil sections oriented substantially parallel to each other; and
      a magnetic loop substantially encircling and electrically isolated from said coil sections, said loop including first and second ferromagnetic pole tips that are disposed adjacent to said media-facing surface and separated by a submicron nonferromagnetic gap, said loop including a first ferromagnetic pole layer adjoining said first pole tip, said loop including a second ferromagnetic pole layer adjoining said first pole layer, wherein said first and second pole layers are separated from said media-facing surface by a distance greater than that between said first pole tip and said media-facing surface.

18. The device of claim 17, wherein said second pole layer is separated from said media-facing surface by a distance substantially identical to that between said first pole layer and said media-facing surface.

19. The device of claim 17, wherein said first pole tip and said second pole layer have a substantially identical width in a direction that is substantially parallel to said media-facing surface and to an elongate dimension of said gap.

20. The device of claim 17, wherein said first pole layer has a surface closest to said media-facing surface that slopes away from said media-facing surface from said first pole tip in said first direction.

21. The device of claim 17, wherein said second pole layer has surface closest to said media-facing surface that slopes away from said media-facing surface from said first pole tip to said first pole layer.

22. The device of claim 17, wherein said loop includes a third ferromagnetic pole layer adjoining said second pole tip, and said third pole layer is separated from said media-facing surface by a distance greater than that between said second pole tip and said media-facing surface.

23. The device of claim 17, wherein said at least one of said pole tips includes a high magnetic saturation material adjoining said gap.

24. The device of claim 17, further comprising a magnetic field sensor disposed adjacent to said media-facing surface.

* * * * *